United States Patent [19]

Mehnert et al.

[11] Patent Number: 4,734,794

[45] Date of Patent: Mar. 29, 1988

[54] DEVICE FOR RECORDING AND REPRODUCING AUDIO SIGNALS ON FLAT RECTANGULAR RECORDING MEDIA

[76] Inventors: Gottfried Mehnert, Messelstrasse 25, D-100 Berlin 33; Karl-Ludwig Zorn, Breite Strasse 42, D-1000 Berlin 33, both of Fed. Rep. of Germany

[21] Appl. No.: 814,788

[22] Filed: Dec. 30, 1985

[51] Int. Cl.$^4$ .......................... G11B 5/58; G11B 25/04
[52] U.S. Cl. ........................................ 360/2; 360/107; 235/449; 235/479
[58] Field of Search ........................... 360/2, 101, 107; 235/449, 475, 479

[56] References Cited

U.S. PATENT DOCUMENTS

| | | | |
|---|---|---|---|
| 3,307,163 | 2/1967 | Rabinow | 360/101 |
| 3,671,044 | 6/1972 | Blazevic et al. | 360/2 |
| 3,731,061 | 5/1973 | Laybourn | 360/2 |
| 4,150,784 | 4/1979 | Moorman et al. | 235/479 |
| 4,581,523 | 4/1986 | Okuno | 235/449 |
| 4,591,937 | 5/1986 | Nakarai et al. | 360/107 |

*Primary Examiner*—Raymond F. Cardillo
*Assistant Examiner*—Sorinder Sachar

*Attorney, Agent, or Firm*—Penrose Lucas Albright Pravel, Gambrell, Hewitt, Kimball & Krieger

[57] ABSTRACT

Apparatus for recording and reproducing audio signals on flat rectangular recording media comprising a magnetic coating or the like on at least one side. A magnetic head on a swing arm moves across the magnetic media in mutually parallel lines guided by a heart-shaped cam, the recording medium being stationary during recording and reproducing so its visible surface can be examined without difficulty. The heart-shaped cam is of asymmetric configuration, and the magnetic head is pivotably mounted on one end of the swing arm which carries between its ends a cam follower peg which continually engages the heart-shaped cam while under spring loading. The other end of said swing arm is pivotably mounted on a sliding carriage plate which is moved stepwise perpendicularly to the chord of the curved path of movement of the magnetic head for each line. The stepwise perpendicular movement of the sliding carriage plate is produced by a mechanism which is controlled by the reversal of direction of the magnetic head.

9 Claims, 5 Drawing Figures

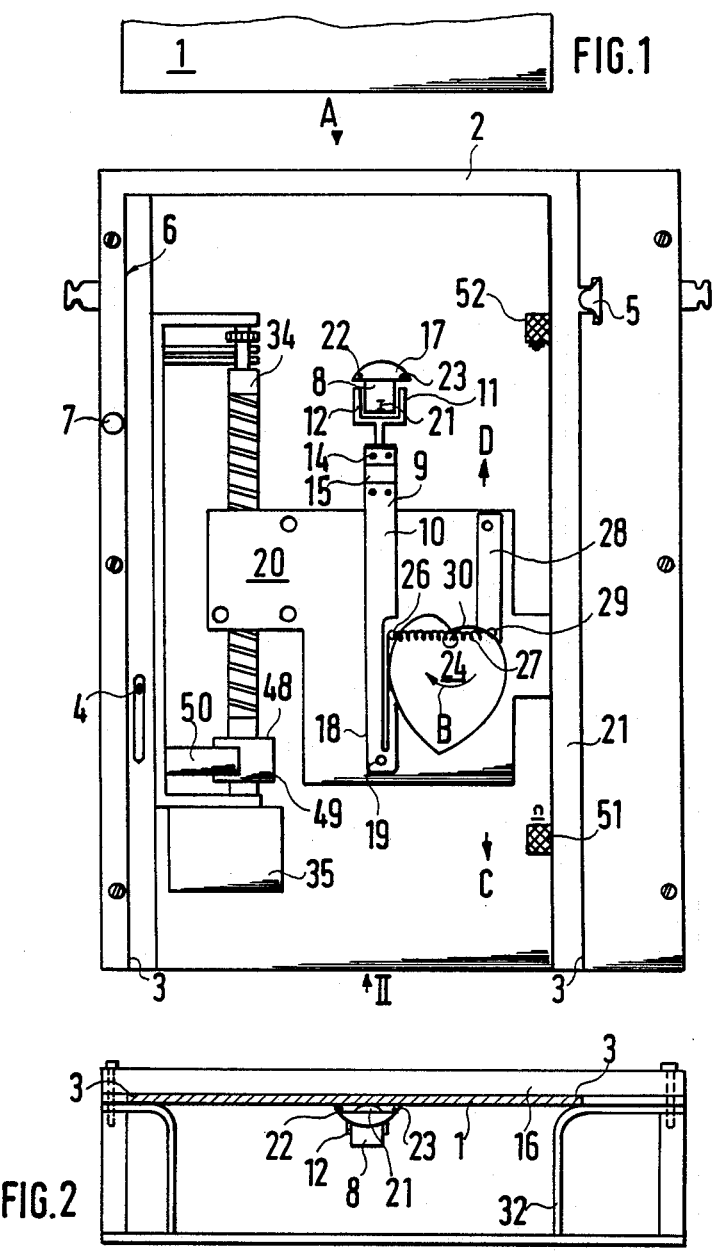

DEVICE FOR RECORDING AND REPRODUCING AUDIO SIGNALS ON FLAT RECTANGULAR RECORDING MEDIA

FIELD OF THE INVENTION

The invention relates to a device for recording and reproducing audio signals on flat rectangular recording media, which media comprise a magnetic coating or the like on at least one side; the subject device comprising a magnetic head movable by means of a heart-shaped cam, which head is guided, for recording or reproducing, back and forth over the width or length of the recording medium in mutually parallel, uniformly spaced lines, so that at the end of each line a transition takes place to the next line, and mechanisms are provided which ensure that the lines are tracked in the reproducing mode in the same direction of movement of the magnetic head as in the recording mode.

BACKGROUND OF THE INVENTION

In a known device of the type involved (Ger. 19 34 134 B 2) the magnetic head is moved alternately back and forth on a sliding carriage which is guided in straight line movement, whereby line advance is accomplished by linewise translational advance of the recording medium.

This device has the disadvantages that the means of guiding and driving the magnetic head are relatively expensive, and thus elevate the cost of the device as a whole, and that, moreover, because line advance is accomplished by moving the recording medium, it is more difficult to read or examine writing or graphics which have been applied to the exposed surface of the recording medium.

Accordingly, the underlying purpose of the invention is to eliminate the abovementioned disadvantages and to devise a mechanically simple apparatus wherein the recording medium is stationary during recording and reproducing, so that the visible surface of said medium can be examined without difficulty.

SUMMARY OF THE INVENTION

This problem is solved according to the invention in that the magnetic head is pivotably mounted on one end of a spring-loaded swing arm which, between its ends has a cam follower peg that bears on and moves along a heart-shaped cam. The other end of said spring-loaded swing arm is pivotably joined to a sliding carriage plate which is slidably guided perpendicularly to the chord of the curved path of movement of the magnetic head for each line on the recording medium which is held relatively stationary. Such movement of the sliding carriage plate is produced by a mechanism which is controlled by the reversal of direction of the magnetic head.

To maintain at least approximately constant tension in the spring which tensionally holds the cam follower peg against the heart-shaped cam, preferably a compensation arm having another cam follower peg is also pivotably mounted on the sliding carriage plate. This second follower peg glides along the heart-shaped cam on the side thereof opposite the swing arm so that an imaginary line joining the follower peg of the swing arm and that of the compensation arm intersects the axis of rotation of the heart-shaped cam. In addition, a tension spring joins the swing arm and the compensation arm.

For a stepwise line advance of the sliding carriage plate, preferably a threaded shaft is provided which translationally moves a translating member which is attached to the carriage plate. Further, in this connection, the sliding carriage plate may be connected to a reduction drive which drives a dog, a cam, or the like that actuates a characterizing contact, and which drive also possibly drives a double dog, double cam, or the like which acts on a switch contact for shutting off the electric motor.

The mechanisms for ensuring that the direction of movement of the magnetic head during recording and playback are the same include a double-throw set of contacts having a neutral position, one of which contacts is connected directly with the control electronics for partial step-advancement of the sliding carriage plate, and the other of which is connected to a characterizing contact. This characterizing contact can be actuated by the mechanism for step-advancement of the sliding carriage plate so that it is actuated only at each second line. If the said double-throw contacts comprise a middle contact that alternately presses against each of two outer contacts, and the middle contact is mechanically connected to the rotational axis of the swing arm which bears the magnetic head, a signal for immediate stepwise line-advancement can be generated by the the middle contact engaging one or the other of the outer contacts and based on the position of the reduction drive.

Overrun by the electric motor due to inertia can be prevented by a mechanical brake mechanism provided on the threaded shaft, or by controlled reversal of the polarity of the drive motor.

An exemplary embodiment of the invention will now be described, with reference to the drawings.

BRIEF DESCRIPTION OF THE DRAWINGS

FIG. 1 is a top view of the inventive device with cover plate removed;

FIG. 2 is a view in the direction of arrow II of FIG. 1;

DESCRIPTION OF THE PREFERRED EMBODIMENTS

Figure 3:
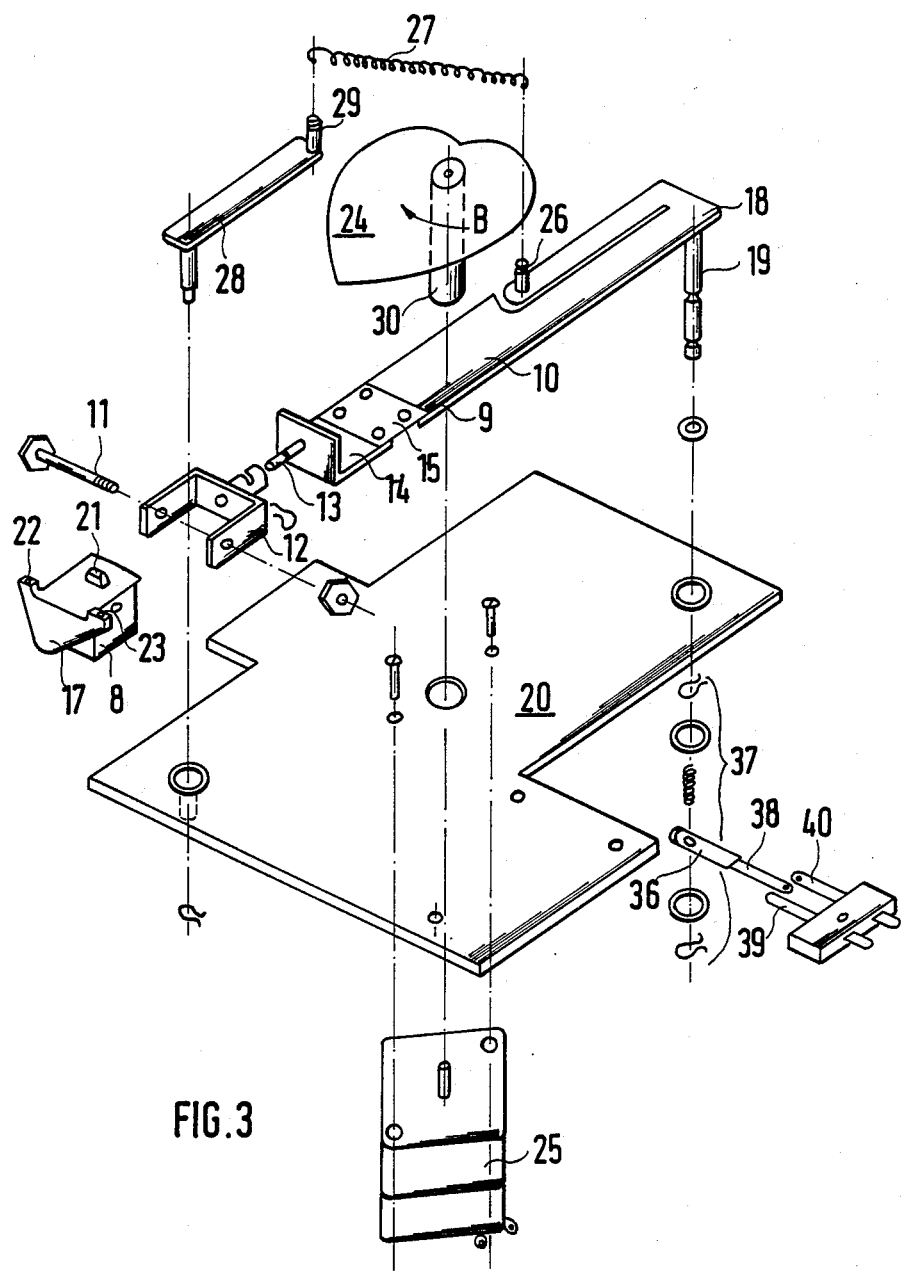
FIG. 3 is an exploded view of the parts of the magnetic head which support it and bring about its swinging movement.

The inventive device is simplified as in the drawings. Features not needed to understand and carry out the invention by those skilled in the arts involved have been omitted. In particular, the electrical and electronic circuitry required for the operation of the apparatus has been omitted; this circuitry, as such, is not the subject of the invention, and is well known to those skilled in the art.

The device illustrated serves to record and reproduce audio signals on one or both sides of a flat rectangular, cardlike recording medium support which support bears a magnetic coating or the like on one or both sides. A recording medium support 1 is slid in direction A into a slot 2, along guide edges 3 to an end position in which an ejector 4 is stressed and also a main switch (not shown) is tripped-on and the apparatus is prepared for operation. A leaf spring 5 reproducibly urges recording medium support 1 against a reference edge 6.

An ejector knob 7 may be actuated at any time to interrupt the recording or reproducing, and recording medium support is then pushed by ejector 4 until it extends about one centimeter out of slot 2 where it can be easily manually removed. At the same time, the power is interrupted. At the end of the recording or reproducing process, ejector 4 is also automatically triggered and pushes the card out of the slot in the manner described.

For recording or reproducing, a magnetic head 8 is moved at uniform speed line-by-line in curved paths over the recording medium. The magnetic head 8 executing this movement is pivotably mounted on a pivot 11 in a forked member 12 on one end 9 of a swing arm 10. Forked member 12 is in turn rotatable on a pin 13 (FIG. 3) fixed to an angle piece 14 connected by a flat spring 15 to swing arm 10 which arm presses the audio head against the recording medium. The backing support which absorbs the force of head 8 on the recording medium support due to the action of spring 15 is comprised of a cover plate 16 that is a transparent plastic. Plate 16 extends over recording medium support which is visible through plate 16. Also identification on the recording medium carried by the recording medium support 1 can be viewed through plate 16. A guide plate 17 facilitates the engagement of recording medium support 1 as it is received between magnetic head 8 and the cover plate 16, such engagement being engaged by action of spring 15. If spring 15 is sufficiently flexible, forked member 12 may be dispensed with.

The other end 18 of swing arm 10 is pivotally mounted on pivot axle 19 received in a sliding carriage plate 20.

For good audio signal quality it is extremely important to have exact positioning of a gap 21 of magnetic head 8 on the cardlike recording medium support 1. To ensure this, two protuberances 22 and 23 are provided on guide plate 17, which protuberances together with the head gap 21 comprise a uniquely defined three-point support.

The swinging movement of swing arm 10 is produced by means of a disc-like heart-shaped cam 24 which rotates in direction B, driven by a drive motor 25 (FIG. 3). A cam follower peg 26 mounted on swing arm 10 glides along the cam 24 under spring loading provided by a spring 27. To maintain a constant force of the follower peg 26 against cam 24, a compensation arm 28 with a cam follower peg 29 is pivotably mounted on sliding carriage plate 20 so that follower peg 29 glides along cam 24 on its side opposite swing arm 10. In this arrangement imaginary line joining the cam follower pegs 26 and 29 intersects rotational axis 30 of cam 24. Spring 27 joins the two rods 26 and 29, thus connecting swing arm 10 to compensation arm 28. In this way, the distance between follower pegs 26 and 29, and thus the force of the spring 27, remains approximately constant.

Figure 4:
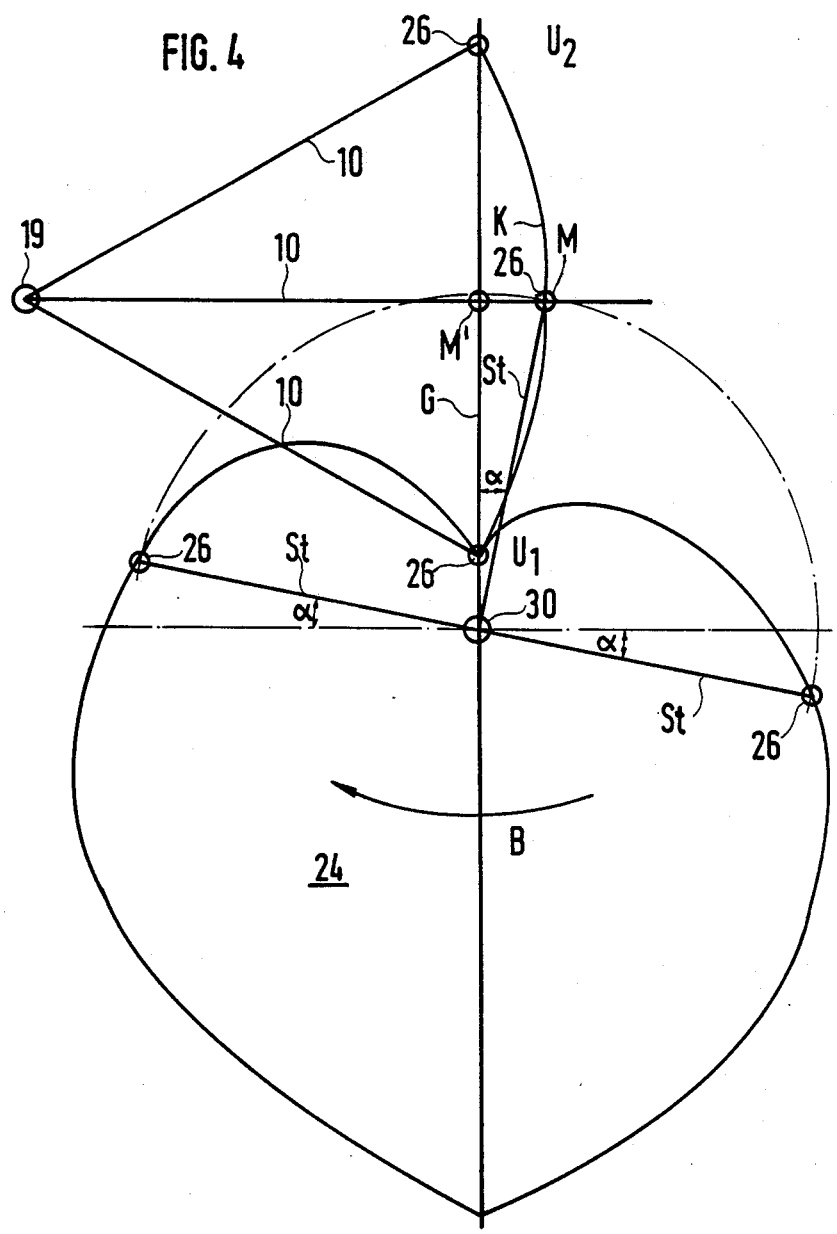
FIG. 4 illustrates important geometric interrelations for the structure of the heart-shaped cam.

Important geometric interrelations for the structure of the heart-shaped cam are seen from FIG. 4. An important consideration is that the follower peg 26 does not move along the straight line G through the reversal points U1 and U2 and through the rotational axis 30 of the heart-shaped cam, but rather it moves along a circular arc K, thus executing a movement that has a component perpendicular to the said straight line G. A consequence of this perpendicular component is that starting from the reversal point U1 the follower peg 26 "rides up" (upward as seen in FIG. 4) on the heart-shaped cam 24 during the first 90° excursion of the latter in direction B. When the cam completes the rotation through 90° in direction B; that is, when the dot-dashed line, as shown in FIG. 4, coincides with line G, then the straight follower peg 26 is disposed in one of its two middle positions M (which occurs during the complete back-and-forth cycle U1-M-U2-M-U1) which is at a perpendicular distance M-M from the line G. Accordingly, the imaginary line between the rotational axis 30 of the cam and the middle position M of the follower peg 26 is at an angle alpha [from line G] which is the angle by which the actual contact point of the follower peg 26 against the cam surface of the cam is displaced from said line G. Accordingly, the radial line St between the rotational axis 30 and the middle position M of the follower peg 26 is thus at an angle alpha to the said dot-dashed "90° line" [(relating to the structure of the cam)].

In the course of further rotation of the cam and the movement of the follower peg 26 along the circular arc to the second reversal point U2, this angle, the instantaneous angle of displacement of the peg contact continuously decreases until at U2 it is again zero. During the return excursion from U2 to U1, the process is repeated, and the increasing and decreasing angles alpha corresponding to the various angles of swing of the swing arm 10 between U1 and U2 must be taken into account in setting up the course of the radial lines St by which the configuration of the cam is generated.

The result, as seen from FIG. 4, is a cam having an asymmetric shape, which shape is not depicted here with precision but only approximately.

Figure 5:
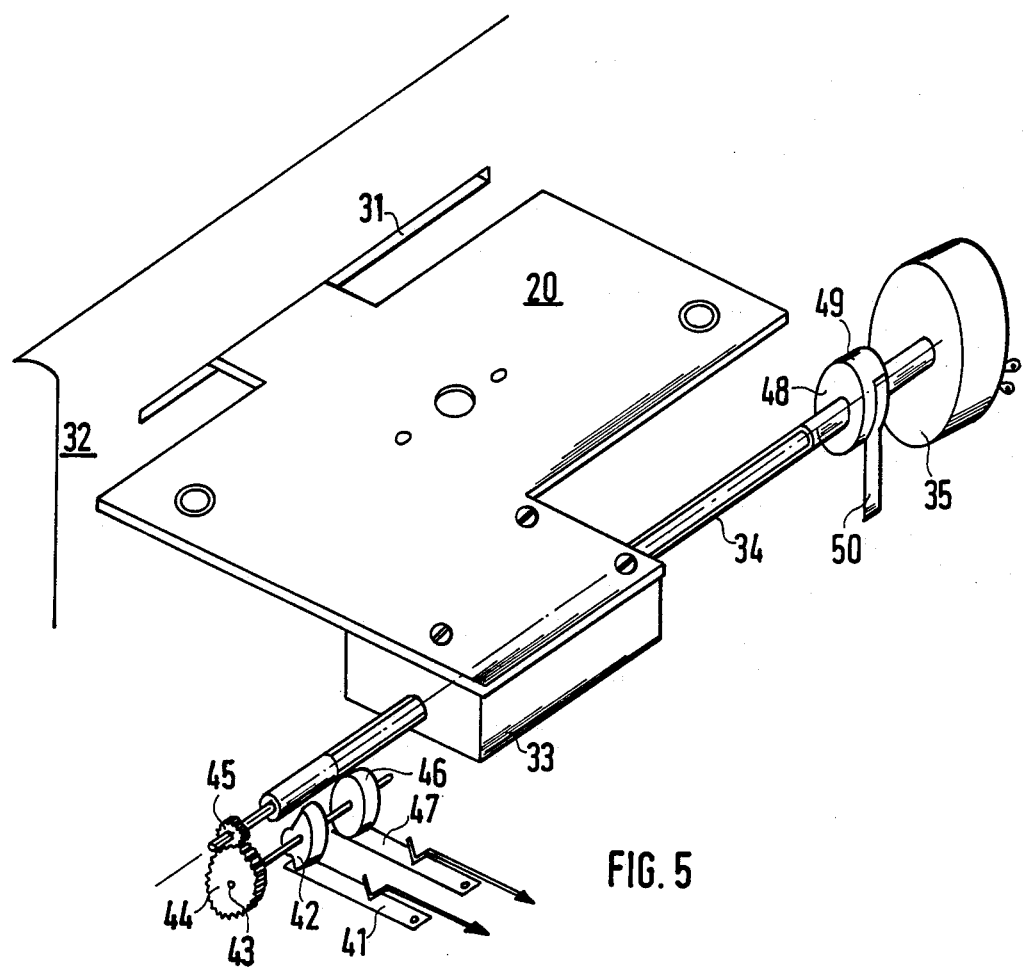
FIG. 5 is an exploded view of the parts which produce the line-to-line stepping movement (stepwise line advance) of the magnetic head.

Each time a reversal point is reached in the swinging movement of the magnetic head 8, the sliding carriage plate 20 which bears the swinging mechanism is translated by the distance of one line width. The carriage plate 20 is guided on one side in a slot 31 (FIG. 5) of an apparatus housing 32. On the other side the carriage plate 20 rests on a translating member 33 to which it is attached by screws (for example). The translating member 33 is moved by a threaded shaft 34 the pitch of which is selected so that one revolution of the shaft (produced by an electric motor 35) corresponds exactly to one line-advance (path width plus intermediate space) of the sliding carriage plate.

To produce the starting signal (pulse) for the shaft drive, a contact arm 36 is mounted on the rotational axle 19 of swing arm 10, arm 36, which bears the middle contact 38 of a double-throw switch with neutral position, being carried along by a slip clutch 37. Depending on the direction of travel of swing arm 10, slip clutch 37 presses the contact arm 36 against one of two outer contacts 39 and 40. At the instant of the reversal of the swinging direction, the middle contact 38 opens the previously closed outer contact, and then immediately thereafter closes the second outer contact. The associated electronic circuitry is set up such that the opening of the outer contacts i.e., of each of the outer contacts in turn, triggers the starting signal (pulse) for electric motor 35.

It is important for trouble-free functioning of the device that the magnetic head 8 contact and follow the lines uniformly, in recording and reproducing, and thus that mechanisms are provided whereby the direction of travel of the magnetic head when following the lines is the same for reproduction as for recording. Toward this end, in the device described one of the two outer contacts does not lead directly to the electronics but to a characterizing contact 41 which is actuated by a dog 42 or the like mounted on an axle 43. Since the reduction drive from the threaded shaft 34, which drive is comprised of spur gears 44 and 45, has a gear ratio of 2:1 with respect to the rotation of the threaded shaft 34, characterizing contact 41 is closed only once in two revolutions of the shaft 34. The signal from the given outer contact 39 or 40 then passes from contact 41 to the control electronics for the electric motor 35.

The arrangement with dog 42 and characterizing contact 41 actuated by dog 42 functions such that a signal furnished from the relevant outer contact at the end of the swinging movement of the magnetic head 8 in one direction is only passed to the control electronics for step-advancing the sliding carriage plate if the preceding head movement is of the correct type [i.e., direction] for the line for which said movement is intended, e.g. right to left for the even-numbered lines and left to right for the odd-numbered lines. Otherwise, (if the head has just moved over the line or a part thereof in the wrong direction) when the direction change occurs no line-advance occurs, so that the line is now tracked in the correct direction. At the end of this tracking excursion, the line-advance is then carried out as provided for, because the coincidence of the tracking direction for recording and reproducing has been established. Since under this arrangement any necessary correction of the tracking device is made only at the line-advance time, i.e. after the end of a line has been reached, if at the start of a wrong-direction tracking sweep, the magnetic head is at or near the beginning of a line, a great deal of time can be wasted before the direction is corrected. Accordingly, in an improved embodiment it is provided that via a logic block a signal is obtained from the contacting of the middle contact 38 with the outer contact 39 or the other outer contact 40, and a signal is also obtained from the position of the gears 44 and 45 of the reduction drive, whereby when the playback direction is incorrect i.e., does not correspond to the recording direction, a line-advance signal (pulse) is generated immediately, but if the tracking direction is correct then no such line-advance signal is generated.

A dual dog 46 is mounted on axle 43, which dog actuates a shutoff contact 47 at each revolution of the threaded shaft 34, whereby the signal (pulse) from said contact 47 causes the electric motor 35 to stop after one revolution of the threaded shaft 34.

In order to prevent overrun due to inertia in electric motor 35, a mechanical brake mechanism may be provided, comprised of a brake drum 48 with a covering 49 of, e.g., felt material, and a brake spring 50. It is also possible to employ a control pulse to reverse the polarity of the electric motor, to produce an immediate braking action which is not of constant duration as is the friction brake.

At the end of the translational advance path of the sliding carriage plate 20 in direction C (FIG. 1) an end switch 51 is provided, the signal from which may be employed, e.g., to reverse the electric motor and move the carriage plate 20 in direction D by continuous driving of the threaded shaft 34, and if desired, at the same time, to control drive motor 25 via contacts 38 and 39 (or contacts in parallel with these) such that magnetic head 8 comes to rest in its end position which corresponds to the start of tracking. As soon as carriage plate 20 is moved back in direction D into its starting position for recording or playback of audio signals, it trips a second end switch 52 whereby the electric motor 35 is shut off, or, if desired, said motor may be first reversed and then shut off. End switch 52 may also be employed to operate electromagnetically ejector knob 7 to slide the recording medium support which is in the device back to its position in which it can be removed, and thereby also to shut off the main switch of the device.

List of Reference Symbols [Used in the Drawings]

1—Card-shaped recording medium support
2—Slot
3—Guide edges
4—Ejector
5—Pushing spring [for exerting lateral force on the recording medium support, against the reference edge 6]
6—Reference edge
7—Ejector knob
8—Magnetic head
9—End of arm 10
10—Swing arm
11—Axle
12—Forked member
13—[Pivot] pin
14—Angle piece
15—Spring
16—Cover plate
17—Guide plate
18—End of arm 10
19—Rotational axle
20—Sliding carriage plate
21—Head gap of head 8
22—Protuberance
23—Protuberance
24—Heart-shaped cam
25—Drive motor
26—Cam follower peg
27—Spring
28—Compensation arm
29—Cam follower peg of [i.e., "on"] arm 28
30—Axle of cam 24
31—Slot in housing 32
32—Apparatus housing
33—Translating member
34—Threaded shaft
35—Electric motor
36—Contact arm
37—Slip clutch
38—Middle contact
39—Outer contact
40—Outer contact
41—Characterizing contact
42—Dog or cam
43—Axle
44—Spur gear
45—Spur gear
(44, 45)=Reduction drive
46—Double dog or double cam
47—Shutoff contact
48—Brake drum
49—Covering on drum 48
50—Brake spring
51—End switch
52—End switch
G—Straight line
K—Circular arc
M—Middle position of peg 26 [in its arcuate excursion]
M′—Middle point between U1 and U2

U1—First reversal point of [movement of] peg 26
U2—Second reversal point of [movement of] peg 26
St—Radial line originating at axle 30
alpha=Angle between lines G and St Having disclosed our invention, what we claim as new and to be secured by Letters Patent of the United States is:

1. A device for recording and reproducing audio signals on flat rectangular recording media, which media has a magnetic coating or the like on at least one side, the subject device comprising a magnetic head movable by means of a heart-shaped cam which guides the head for recording or reproducing, back and forth across the recording media in mutually parallel, uniformly spaced lines, a transition taking place at the end of each line to the next line; mechanisms that ensure the lines are tracked in the reproducing mode in the same direction of movement of the magnetic head as in the recording mode; said heart-shaped cam having an asymmetric shape; said magnetic head being pivotably mounted on one end of a swing arm which carries between its ends a cam follower peg that continuously engages said heart-shaped cam while under spring loading, the other end of said swing arm being pivotably joined to a sliding carriage plate which is slidably guided perpendicularly to the chord of the aforesaid back and forth path of movement of said magnetic head for each said line; and means controlled by the reversal of direction of said magnetic head causing equal transitional steps in said perpendicular movement of said sliding carriage.

2. A device according to claim 1 comprising a compensation arm with a second cam follower peg which is pivotably mounted on said sliding carriage plate so that said second follower peg continuously engages said cam on the side thereof opposite said swing arm, an imaginary line joining said cam follower pegs intersecting the axis of rotation of said heart-shaped cam, and a spring connecting said swing arm to said compensation arm.

3. A device according to claim 1 comprising a guide plate which is provided on said magnetic head, said guide plate comprising two protuberances and said magnetic head comprising a head gap to provide a well-defined three-point support on the recording media.

4. A device according to claim 1 wherein said mechanisms for the line by line advance of the magnetic head and for ensuring that the direction of movement of the magnetic head coincides in recording and reproducing comprise double-throw contacts having a neutral position, said contacts being actuated by the reversal of movement of said magnetic head, one of said contacts being connected directly with control electronics for stepwise line-advance of said sliding carriage plate and the other of said double-throw contacts being connected to a characterizing contact which is actuated by said mechanism producing the step-advance of the carriage plate, said actuation being such that said characterizing contact is only actuated at each second line.

5. A device according to claim 4 wherein said double-throw set of contacts having a neutral position comprise a middle contact which alternately rests against each of two outer contacts and which is connected to a rotational axis of said swing arm by a slip clutch.

6. A device according to claim 4 comprising a threaded shaft driven by an electric motor which provides the stepwise line-advance of said sliding carriage plate, said threaded shaft causing translational movement of a translating member attached to said carriage plate, the actuation of said characterizing contact being derived from the rotation of said threaded shaft.

7. A device according to claim 6 comprising a reduction drive in a 2:1 ratio connected to said threaded shaft, a further cam being driven by said reduction drive that actuates said characterizing contact.

8. A device according to claim 6 comprising a double cam, a reduction drive driving said double cam, a shut-off contact for shutting off said electric motor activated by said double cam.

9. A device according to claim 5 wherein said means controlled by reversal of direction comprises an electronic circuit that produces a signal for immediate stepwise line-advance of said sliding carriage plate, said signal being produced from the contacting of said middle contact with one or the other respectively of said outer contacts and also by the position of reduction drive gears which are included in the device.

* * * * *